Patented Oct. 16, 1945

2,386,885

UNITED STATES PATENT OFFICE 2,386,885

PIGMENTS AND PROCESS OF MAKING THE SAME

Charles D. Downs, Woodbury, and Harold F. Saunders, Haddonfield, N. J., assignors to The Sherwin-Williams Company, Cleveland, Ohio, a company of Ohio No Drawing. Application March 8, 1941, Serial No. 382,332

4 Claims. (Cl. 106—292)

This invention involves certain new and useful improvements in the manufacture of titanium dioxide pigments, whereby there is produced a free-running dry product having improved texture characteristics, and which has a dusty rather than a sticky state.

Titanium dioxide is a white pigment extensively used in the paint and varnish industry, as well as in the paper, rubber, textile and other fields. It is commonly prepared by thermal hydrolysis of, or by chemical precipitation from, mineral acid solutions of titanium under rigidly maintained conditions of concentration, temperature, and other factors. The hydrous titanium oxide obtained by these or similar means is washed and subjected to a calcination treatment as, for instance, in a rotary calciner at 800° C. to 1000° C. whereby pigmentary titanium dioxide results.

Titanium dioxide as discharged from the calcining operation is customarily reslurried in water and wet ground, frequently in the presence of a surfacing agent, added for the purpose of enhancing some particular property such as color retention, gloss, dispersion, wetting, etc. This wet grinding is of special importance in the securing of pigments which will wet easily and disperse in the various oils, solvents, and varnishes used in the manufacture of paint. The addition during the wet milling of various water-soluble soaps, fatty acids, or their salts, or of water-insoluble soaps suspended in organic liquid, etc., is common practice, but pigments when so surface treated are of a somewhat sticky nature and present major operating difficulties through sticking in the mill during the operation of pulverizing or dry grinding after they have been dried.

A water-dispersing grade of titanium dioxide is customarily secured by grinding directly after calcination without the wet-milling or treatment as an intermediate step. The product, although showing a high degree of wettability and dispersion in water, is of extremely poor dispersing characteristics in non-aqueous liquids, such as are used in the paint and varnish industry, and, when incorporated into these liquids, they give specky, rough paints which settle badly and do not produce smooth and even films. For usage in the paint and varnish field the wet-milling step has been considered essential.

In the paint industry, the dry, pulverulent pigment is incorporated into viscous liquids, like linseed oil and varnish bases. Paint mills having rubbing elements of some sort are always employed following a preliminary mixing. The function of these mills is one of incorporation and not one of comminution, and the better the wetting and dispersion ease, and physical form of the pigment, the less time and energy is required in the operation of such mills, and the higher their production rate for a given standard of smoothness.

It has hitherto been practically impossible to produce a smooth paint which shows few or no specks when spread in a thin layer, when using a titanium dioxide which has been dry ground after calcination without the intermediate wet-milling step.

In practice we prefer to accomplish dry pulverization in a roller mill of the Raymond or Williams type with air separation devices attached, or in a mill of any other type wherein disruption by high velocity steam or air currents is employed for disintegration of the aggregates, or to combinations of these types of mills placed in series wherein the titanium dioxide passes from one to the other. For the same rate of production, the fineness, gloss, wetting and dispersing characteristics of a given pigment are greatly improved in a product treated according to our invention as compared with the same titanium dioxide not so treated. Sticking in the mill is practically entirely eliminated and a considerably greater production with improved texture characteristics may be obtained.

We have discovered that when a small amount of certain dry substances is incorporated into the dry titanium dioxide by mixing prior to its pulverization, and the mixture then subjected to dry pulverization with air dispersion and separation of fine from coarse particles with return of the coarse particles with the air current, the rate of production of the mill, i. e. the number of pounds per unit of time that can be fed to or discharged from the mill, is greatly increased. No sticking of the pigment in the mill or on the grinding surfaces or flues occurs even in humid weather, and the product from the mill is entirely free from lumps or cake, such as are caused from masses sticking temporarily at some point within the mill and thereby compacting.

It is important in our process that the addition agent which is employed be an essentially dry fracturizable solid or powder. We are familiar with several processes wherein a water-insoluble material such as metallic soap or fatty acid, dissolved or suspended in an organic solvent or in vapor phase may be sprayed upon a finished dry pigment but this is for an entirely different purpose and such treatment is usually given after dry milling, since such treatment renders the pigment almost impossible to grind in dry pulverization mills due to sticking in the mill. Such a product may be wetted and incorporated into an oily liquid, but it is not free-flowing and non-caking during dry pulverization and later packaging and further handling.

In pulverizing a pigment in a ring roller mill equipped with an air separation system, as a Raymond or a Williams roller mill, the material is fed into a cyclic current of air which forces the pigment up through a ring within which heavy rolls are revolving at a high rate of speed. The pigment passes between the ring and the rolls and is thereby reduced to a powder by centrifugal grinding action, with, however, a tendency toward compacting of the separated particles in the form of flakelets or pellets termed air flocculates, wherein the individual particles are held together by surface charges on the particle. The reduced pigment from the rolls is drawn out of the mill at the top by the air separation system and classified, the fine particles being removed, the coarser particles returned to the bottom of the mill for a second passage. The same force that tends to hold the air occulates together, also tends to deposition of layers of pigment in the various ducts and on the walls of the mill.

In passing between the rolls, the pulverization of the adherent groups of particles or aggregates is accomplished, but accompanied by a secondary effect whereby the pressure of the rolls reassembles the particles as loosely bound air flocculates showing up in the product as flakes or pellets. A similar effect is obtained simply by impingement of the particles onto the surface of the mill and in the air ducts. These flakes which may be termed "air flocculates" eventually break off and appear in the product. Some pass on with the air stream; some drop back into the mill by their weight, and the action of the whizzer.

Although these flakes are easily broken down by the fingers, when the mass of pigment is stirred into a vehicle, the tendency is for the vehicle to wet the exterior of the whole flake, forming a sort of envelope which prevents penetration of the vehicle into the interior of the flake or flocculate. The interior of the floc may be actually dry, and when the floc, wetted only on the surface, passes between the rolls of a paint mill, it is broken down, leaving dry pigment which then has to be wetted in a shortage of vehicle and retarding the milling rate.

The addition of treating agents in accordance with our invention, prior to feeding to the pulverizing mill, counteracts the tendency to form flakes, because they neutralize temperary static charges induced by the milling. Said agents act as anti-compactants and do not effect any interbonding of the particles either to each other or to the vehicle in which they are later incorporated. The titanium dioxide is substantially non-reactive to either the added material or said vehicle. Thus there are more of the fine particles which pass out through the whizzer, permitting in turn the feeding of more new material to the mill. This effects either increased rate of production as pounds per hour from the mill at a given mill set or the cutting back of the mill setting by increasing the speed of the whizzer or velocity of air, thereby retaining the material in the body of the mill somewhat longer, and giving increased fineness at the same rate of production. The particle size range may be to about 0.2 to 0.8 microns and the amount of the added material may be 0.1% to 5%, but these are not critical.

Our pigment after processing shows no polar effect that we have located, and its free flowing condition as a powder shows that the neutralization of static charge is permanent. Even the presence of highly humid air in the pulverization apparently effects no reduction of the grinding rate, or the free flowing character of the product, whereas in regular grinding in mills of Raymond type, the material ordinarily sticks badly on days of high air humidity.

We have found that we may employ as addition agents with especial advantage in producing the effect we desire and have described, from 0.5% to 5.0% of abietic acid and metal resinates, zinc, calcium, and magnesium resinate; phenolic resins and phenolic resins modified with maleic, linoleic, linolenic, ester gum, soya bean fatty acids, or tung oil acids, etc.

The following are given merely as examples:

*Example I.*—To 100 pounds of titanium dioxide as discharged from the calciner is added one half pound of dry, powdered zinc resinate, and the latter is roughly mixed in a rotary blade dry mixer to secure fairly uniform distribution of the agent over the mass. This mixture is then fed directly at a predetermined rate into the feed mechanism of a dry roller mill of the Williams or Raymond type, the discharge being collected in paper bags in the customary manner.

In a direct comparison of treated vs. untreated material, in pulverizing in a 16 inch, 3 roll Williams roller mill at a fixed, full load mill setting, the untreated material produced at the rate of 29 lbs. per hour and the treated at 72 lbs. per hour. The mill production from the untreated material showed some small air flocculates and compression flakes, and the mill, after the operation, still retained considerable pigment impacted upon the body of the mill, in the air ports and in the ducts of the air separation device. The milled, treated product was cleaner and brighter in color, due to less abrasion of the mill, free-flowing, and entirely free from air flocculates and flakes, and the mill surfaces were practically clean and free from impacted pigment. When the mill setting was opened up to permit a production of approximately 70 lbs. per hour on the untreated material, the texture was too poor for usage as a paint pigment.

The ready dispersion in air and efficiency of the agent may be shown by taking a sample of calciner discharge, treating as directed, and then pebble milling in the laboratory for two hours. A weighed sample of the pigment prepared in this manner is placed in a 10 cc. Gooch crucible so arranged that air can be passed up through it. The pigment thus dispersed in air is confined in an open glass tube of 1.75 cm. diameter and 1.3 meters long. Pigment properly treated to effect air dispersion will be disturbed by and dispersed in air traveling through the Gooch at the rate of less than one liter (about 0.75 liter) per minute. Pigment properly treated will be suspended in such a stream of air in extremely fine, perfectly dispersed particles; such untreated pigment as may be suspended will occur as coarse, flocculated particles and will require an air flow of 1.8 liters per minute for any appreciable suspension.

Also, pigment properly treated for air dispersion characteristics will, although less bulky in the dry than untreated pigments, show considerably less resistance to displacement, such as occurs when stirred with a spatula.

*Example I(A)*.—Same as Example 1, substituting hydrogenated rosin.

*Example I(B)*.—Same as Example 1, substituting phenolic resin modified with maleic.

*Example II*.—To 100 pounds of titanium dioxide as discharged from the calciner is added one pound of dry, powdered adipic acid, and the latter is mixed in a rotary blade dry mixer to secure fairly uniform distribution of the agent over the mass.

The mixture is then fed directly into the feed mechanism of a jet type of mill. Material thus treated passes readily through the mill with a resultant product showing greater fineness and less flocculation than material not so treated, indicating effective dispersion in the air.

Untreated material cakes and coats the equipment so that operation of the equipment is decidedly unsatisfactory.

The two products were formulated into an alkyd resin enamel of the air drying type, given a preliminary mixing in a pony mixer and ground out at a fixed set on a Lehman roller type paint mill.

The treated product showed considerably greater freedom from specks and much smoother film on a sprayed panel, better gloss and better retention of gloss with considerably less yellowing on exposure to ultraviolet light and water spray in an accelerated test exposure cabinet. In the manufacture of the paint the treated product wetted down quicker in the pony mixer and gave a much smoother base paint.

Although in the foregoing description we have referred only to titanium dioxide, the same procedure has similar advantages when used with certain other pigments as shown in the following examples:

*Example III*.—To 100 pounds of lithopone as discharged from the finished drier (after passing through the wet grinding system, or filtered and dried directly from the quench tank) is added three-fourths of a pound of dry, powdered hydrogenated rosin. The treating agent is mixed thoroughly with the pigment using a rotary blade mixer or rolling in a drum.

The mixture is then fed directly at a predetermined rate into the feed mechanism of a dry roller mill of the Williams or Raymond type, collecting the discharge in the customary manner.

In a direct comparison of treated vs. untreated material, the treated material is of better color, and free from air flocculates with the mill surface remaining clean and free from impacted pigment.

The treated pigment shows considerably less resistance to displacement when stirred dry with a spatula.

*Example IV*.—To 100 lbs. of zinc sulfide as dried from quench tank slurry is added 1% of calcium resinate, which is mixed with the pigment using a rotary blade mixer.

The mixture is passed through a regular roller type mill, collecting the discharge in the customary manner.

The mill operated freely, without clogging and the pigment in paint manufacture showed the same desirable characteristics in comparison with untreated material as has been shown in the foregoing examples, using other pigments.

The same process may be used to advantage with lead carbonate and certain other pigments.

Having thus described our invention, what we claim as new and desire to secure by Letters Patent is:

1. The process of reducing the particle size of calcined titanium dioxide and producing a free-flowing pigment, which comprises adding to the titanium dioxide a small proportion of zinc resinate, pulverizing the mixture in an air stream, separating the fine particles from the air stream and returning the coarse particles for further pulverization.

2. As a new product a free-flowing finely divided pigment composition comprising pulverized calcined titanium dioxide and a small proportion of zinc resinate.

3. The process of producing a fine, free-flowing titanium oxide pigment having improved texture characteristics, and improved mixing and dispersing properties in paint vehicles, said process including disintegrating said pigment in a dry state with a small amount of zinc resinate.

4. The process of producing a fine, free-flowing titanium oxide pigment having improved texture characteristics, said process including rapidly disintegrating said pigment in a dry state with a small amount of zinc resinate in an air stream, separating the fine particles from the air stream and returning the coarser particles with the air stream for further disintegration.

CHARLES D. DOWNS.
HAROLD F. SAUNDERS.